(12) United States Patent
Lee

(10) Patent No.: US 9,702,496 B2
(45) Date of Patent: Jul. 11, 2017

(54) HOSE COUPLING

(71) Applicant: EAGLELITE INDUSTRIAL CO., LTD., Chiao Hsi, I-Lan (TW)

(72) Inventor: Shen-Chih Lee, New Taipei (TW)

(73) Assignee: EAGLELITE INDUSTRIAL CO., LTD., Chiao-Hsi, I-Lan (TW)

( * ) Notice: Subject to any disclaimer, the term of this patent is extended or adjusted under 35 U.S.C. 154(b) by 107 days.

(21) Appl. No.: 14/835,689

(22) Filed: Aug. 25, 2015

(65) Prior Publication Data

US 2016/0084421 A1    Mar. 24, 2016

(30) Foreign Application Priority Data

Sep. 22, 2014 (CN) .................... 2014 2 0546882 U

(51) Int. Cl.
*F16L 55/10* (2006.01)
*F16L 37/18* (2006.01)
*F16L 55/11* (2006.01)
*F16L 37/16* (2006.01)

(52) U.S. Cl.
CPC ........... *F16L 55/1108* (2013.01); *F16L 37/16* (2013.01)

(58) Field of Classification Search
CPC ............................. F16L 37/18; F16L 55/1157
USPC ................... 138/89, 90; 285/87, 80, 84, 312
See application file for complete search history.

(56) References Cited

U.S. PATENT DOCUMENTS

| | | | | |
|---|---|---|---|---|
| 4,295,670 A * | 10/1981 | Goodall | ................. | F16L 37/18 285/312 |
| 5,435,604 A * | 7/1995 | Chen | ...................... | F16L 37/18 285/312 |
| 5,988,693 A * | 11/1999 | Street | ...................... | F16L 37/18 285/312 |
| 6,206,431 B1 * | 3/2001 | Street | ...................... | F16L 37/18 285/312 |
| 6,412,827 B1 * | 7/2002 | Barclay | .................. | F16L 37/18 285/312 |
| 6,447,016 B2 * | 9/2002 | Collier | ................... | F16L 37/18 285/312 |
| 6,508,274 B2 * | 1/2003 | Street | ...................... | F16L 37/18 138/89 |
| 7,644,734 B2 * | 1/2010 | Palmer | ................ | F16L 55/1157 138/89 |
| 8,186,718 B2 * | 5/2012 | Chen | ...................... | F16L 37/18 285/312 |

(Continued)

*Primary Examiner* — Patrick F Brinson
(74) *Attorney, Agent, or Firm* — Pai Patent & Trademark Law Firm; Chao-Chang David Pai

(57) ABSTRACT

A hose coupling includes a hose coupling member and a cover. The cover includes a cover face and a connecting portion. The cover and the hose coupling member are locked through a locking structure. The locking structure includes a handle, an opening, and an annular limit groove. The annular limit groove is disposed around a circumferential wall of the connecting portion. The opening penetrates a side wall of the hose coupling member. One end of the handle is a curved limit portion to mate with the annular limit groove. The limit portion penetrates the opening to be engaged in the limit groove and is hinged on the hose coupling member through a pivot seat. The pivot seat includes a first seat and a second seat. Outer ends of the first seat and the second seat are each formed with a pin hole for a safety pin to be inserted therethrough.

11 Claims, 4 Drawing Sheets

(56) References Cited

U.S. PATENT DOCUMENTS 8,397,764 B2 * 3/2013 Palmer .................. F16L 57/005
                                                       138/89

* cited by examiner

HOSE COUPLING

BACKGROUND OF THE INVENTION (a) Field of the Invention

The present invention relates to a hose coupling, and more particularly to a hose coupling for sealing the distal end of a fluid hose.

(b) Description of the Prior Art

A hose coupling is used to connect the piping of a fluid transport system with a hydraulic component or to seal the distal end of the piping. The hose coupling is the general term of a connecting part which can be disassembled and assembled for a fluid passage. An existing hose coupling used to seal the distal end of a fluid hose (for example: a water hose) includes a hose coupling member connected with a fluid hose and a cap to cover the port of the hose coupling member. The hose coupling member and the cap are locked by a locking device so as to seal the distal end of the fluid hose. In general, the hose coupling is provided with a hook loop. When the hose coupling is connected with the fluid hose, the fluid hose can be dragged by means of the user's finger to hook the hook loop. If the fluid hose is longer, it is laborious to drag the hose by the hook loop and the hook loop may break. During use, the distal end of the fluid hose may be damaged by collision. This causes not only economic loss but also a leakage of the fluid of the fluid hose. Accordingly, the inventor of the present invention has devoted himself based on his many years of practical experiences to solve this problem.

SUMMARY OF THE INVENTION

The primary object of the present invention is to provide a hose coupling which is convenient and safe to use.

In order to achieve the aforesaid object, the hose coupling of the present invention comprises a hose coupling member and a cover. One end of the hose coupling member is for connecting with a distal end of a fluid hose. The cover is inserted into a port of another end of the hose coupling member and configured to seal the hose coupling member. The cover comprises a cover face and a connecting portion disposed under the cover face and adapted to connect the hose coupling member. A grip portion is provided on top of the cover face. A space is defined between the grip portion and the cover face of the cover for an operator's hand to pass therethrough.

The cover and the hose coupling member are locked through a locking structure. The locking structure comprises two handles, an opening, and a limit groove. The limit groove is disposed around a circumferential wall of the connecting portion. The opening is disposed at a side wall of an upper section of the hose coupling member aligned with the limit groove. The two handles are disposed oppositely on the hose coupling member. One end of each handle is a curved limit portion to mate with the limit groove. The curved limit portion penetrates the opening to be engaged in the limit groove and is hinged on the hose coupling member through a pivot seat. The pivot seat comprises a first seat and a second seat which are oppositely disposed relative to the opening. The curved limit portion is pivotally connected between the first seat and the second seat by a shaft. Outer ends of the first seat and the second seat are each formed with a pin hole for a safety pin to be inserted therethrough, enabling the safety pin to lean against the curved limit portion to prevent the handle from turning.

Compared to the prior art, the advantage of the present invention is that the top of the cover face of the cover is provided with the grip portion and the space is defined between the grip portion and the cover face of the cover for the operator's hand to pass therethrough. During use, the fluid handle can be dragged conveniently by means of holding the grip portion. This solves the problem of the prior art that it is laborious to drag the fluid hose and the hook loop may break. The hose coupling is convenient to use. Furthermore, the cover and the hose coupling member are locked through the locking structure, ensuring a tight connection inside the hose coupling so as to seal the distal end of the fluid hose effectively. The locking mechanism can be dismantled and used conveniently.

DETAILED DESCRIPTION OF THE PREFERRED EMBODIMENTS

Embodiments of the present invention will now be described, by way of example only, with reference to the accompanying drawings.

Figure 1:
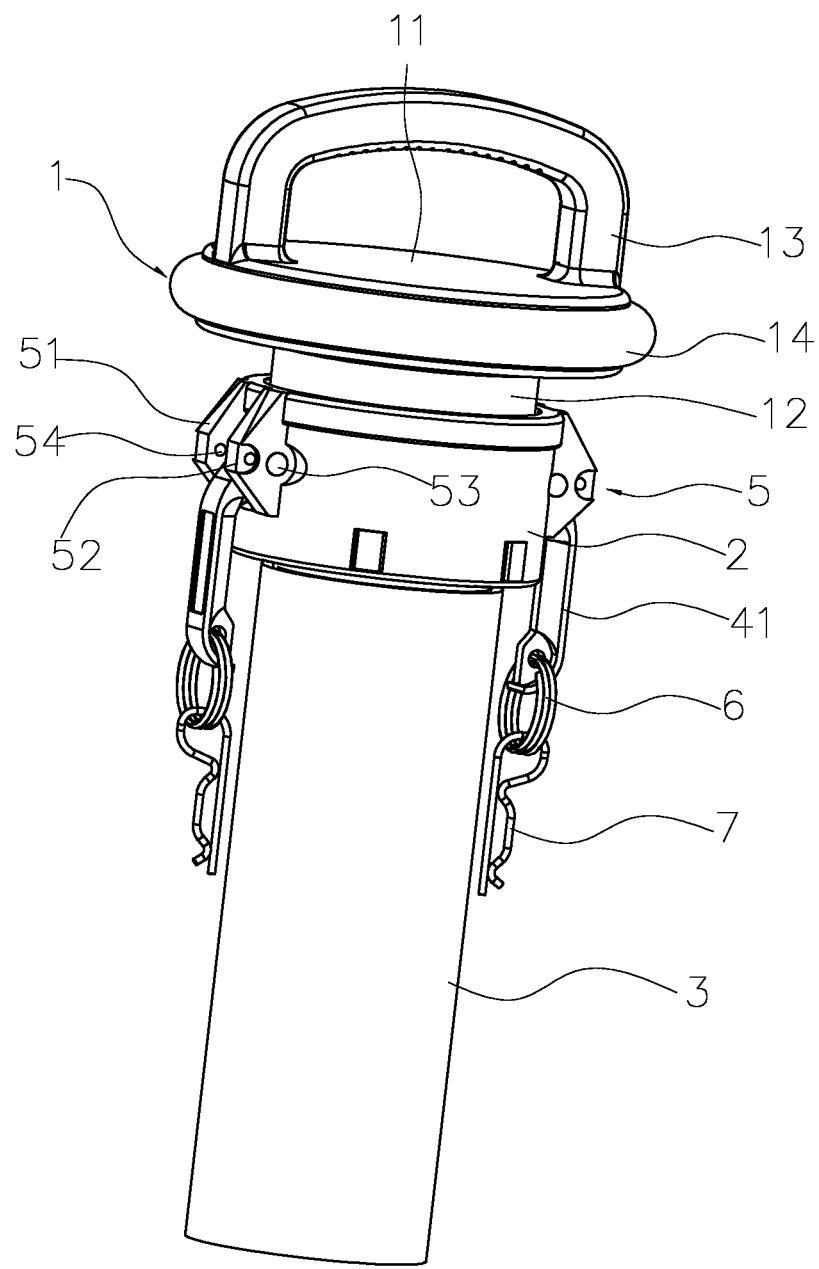
FIG. 1 is a schematic view of a hose coupling according to a preferred embodiment of the present invention when connected to a fluid hose (without the safety pin inserted into the pin holes)
Figure 2:
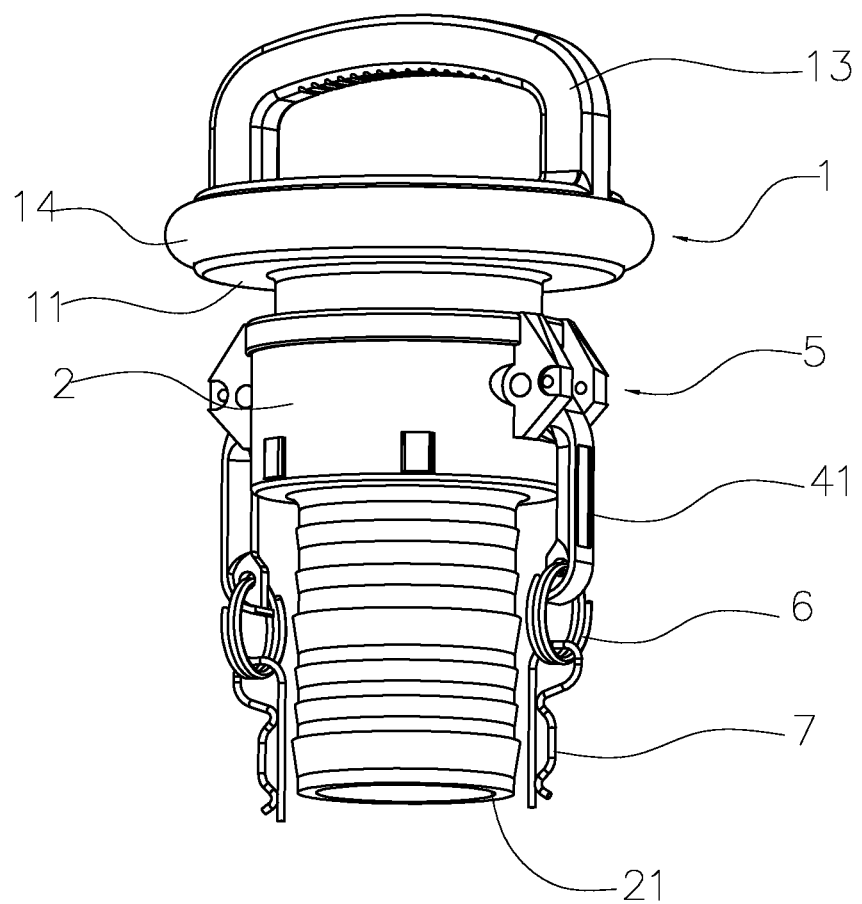
FIG. 2 is a perspective view of a hose coupling according to the preferred embodiment of the present invention.

As shown in FIG. 1 and FIG. 2, a hose coupling according to a preferred embodiment of the present invention comprises a hose coupling member 2 and a cover 1. A lower end of the hose coupling member 2 is a threaded pipe 21. Through the threaded pipe 21, the hose coupling member 2 is connected with a distal end of a fluid hose 3 (such as a soft water pipe). The cover 1 is inserted into a port at an upper end of the hose coupling member 2 so as to form a sealing configuration.

Figure 3:
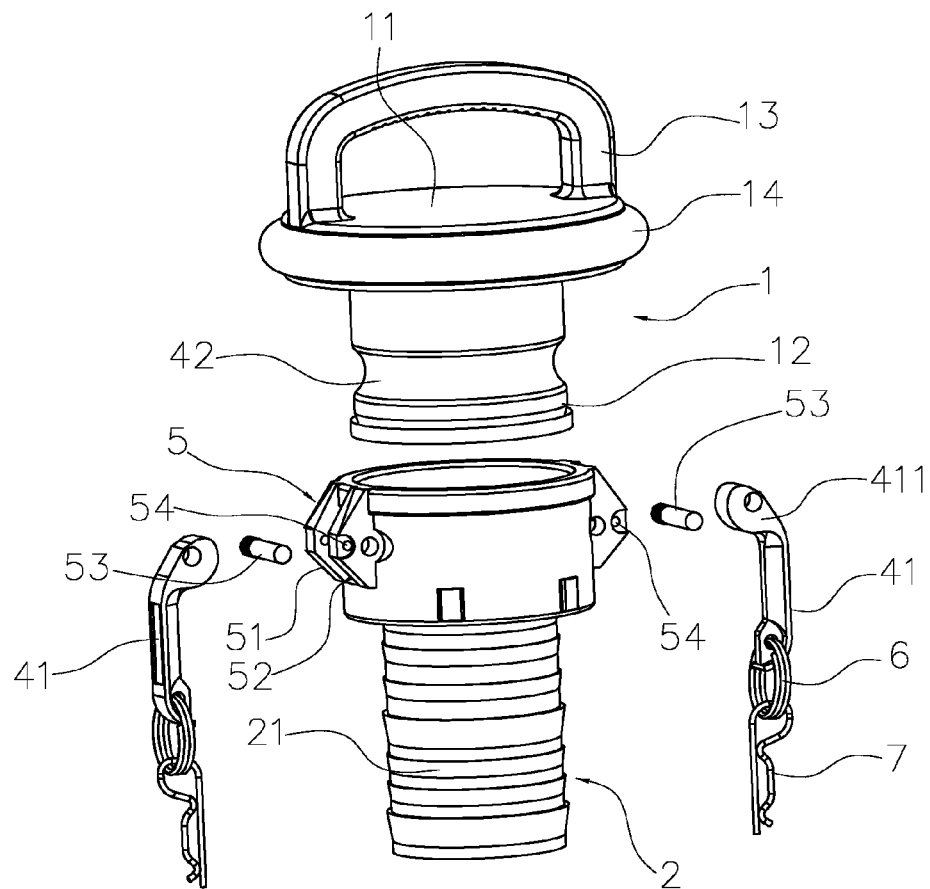
FIG. 3 is an exploded view of a hose coupling according to the preferred embodiment of the present invention.
Figure 5:
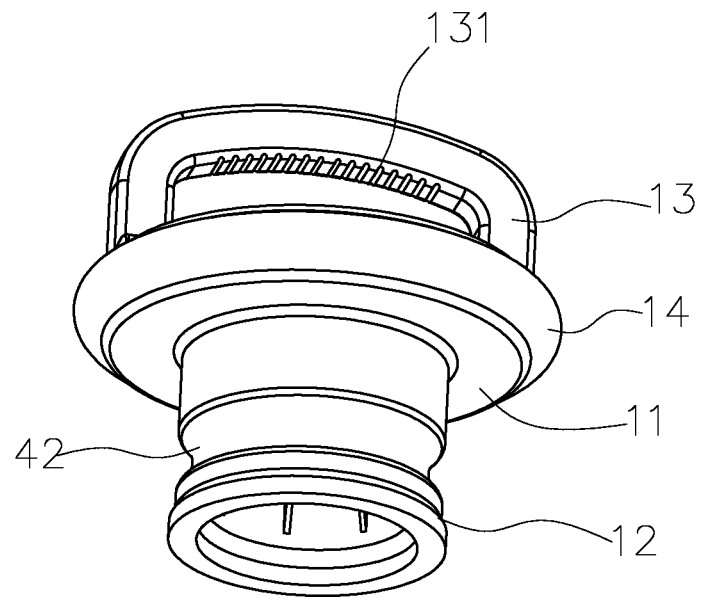
FIG. 5 is a schematic view showing the cover of the hose coupling according to the preferred embodiment of the present invention.
Figure 6:
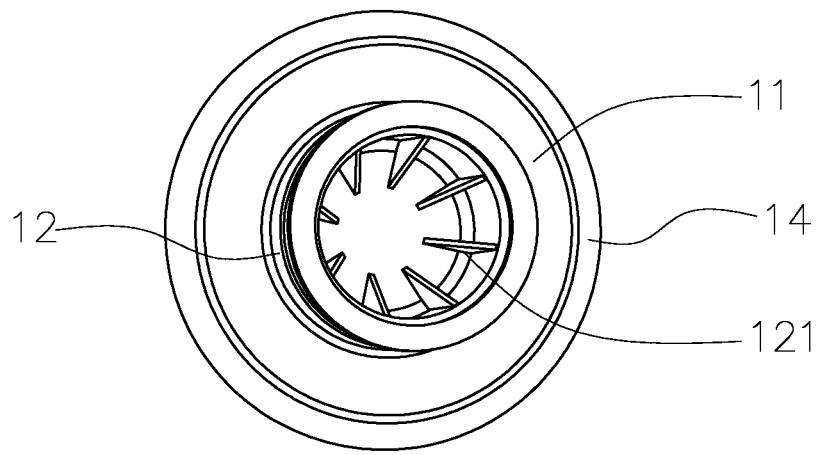
FIG. 6 is another schematic view of the cover shown in FIG. 5.

As shown in FIG. 3, the cover 1 comprises a cover face 11 and a connecting portion 12 disposed under the cover face 12 and adapted to connect the hose coupling member 2. A grip portion 13 is provided on top of the cover face 11. A space is defined between the grip portion 13 and the cover face 11 of the cover 1 for the operator's hand to pass therethrough. For the cover 1 to better protect the distal end of the fluid hose 3 as well as for the operator to pull the fluid hose 3 more conveniently by means of the grip portion 13, the cover face 11 has a circle shape and its radius is greater than the sectional radius of the hose coupling member 2. The grip portion 13 has an arc shape and is disposed radially along an end face thereof. The length of the grip portion 13 is equal to the diameter of the cover face 11. Preferably, the cover face 11 is provided with an annular flange 14 around a circumferential edge thereof. The annular flange 14 is a flange wrapped with a rubber layer to protect the hose coupling member 2 from impact and to prevent the hose coupling member 2 from wear and tear. As shown in FIG. 5 and FIG. 6, for the cover 1 to have a firm configuration, the connecting portion 12 is integrally formed with the cover face 11 to be one-piece. The connecting portion 12 is a hollow configuration and provided with reinforcement ribs 121 which are arranged radially and evenly inside the connecting portion 12. Furthermore, the bottom surface of the grip portion 13, facing the cover face 11, is provided with a anti-skid portion 131 to prevent the operator's hand from skidding.

Figure 4:
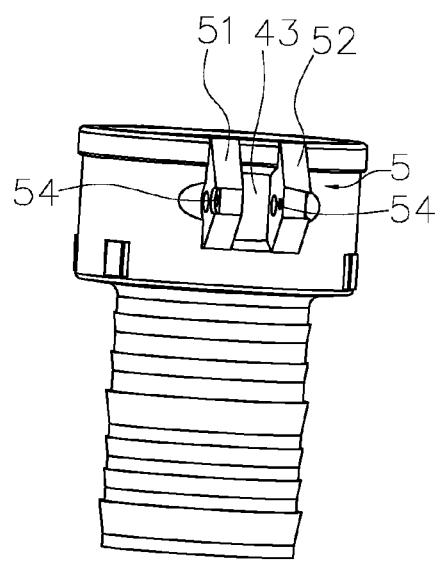
FIG. 4 is a schematic view showing the hose coupling member of the hose coupling according to the preferred embodiment of the present invention.

As shown in FIG. 3 and FIG. 4, the cover 1 and the hose coupling member 2 are locked through a locking structure. The locking structure comprises a handle 41, an opening 43, and a limit groove 42. The limit groove 42 is an annular groove disposed around a circumferential wall of the connecting portion 12. The opening 43 is disposed at a side wall of an upper section of the hose coupling member 2 aligned with the limit groove 42 when the cover 1 and the hose coupling member 2 are locked together. In this embodiment, two handles 42 are oppositely provided on the hose coupling member 2. One end of each handle 41 is a curved limit portion 411 to mate with the limit groove 42. Another end of each handle 41 is provided with a circular hook 6. The circular hook 6 is adapted for a safety pin 7 to be hooked thereon when the hose coupling is not used. This can prevent the safety pin 7 from losing. The curved limit portion 411 penetrates the opening 43 to be engaged in the limit groove 42 and is hinged on the hose coupling member 2 through a pivot seat 5. The pivot seat 5 comprises a first seat 51 and a second seat 52 which are oppositely disposed relative to the opening 43. The curved limit portion 411 is pivotally connected between the first seat 51 and the second seat 52 by a shaft 53. Outer ends of the first seat 51 and the second seat 52 are each formed with a pin hole 54 for the safety pin 7 to be inserted therethrough, such that the safety pin 7 is to lean against the curved limit portion 411.

When in use, as shown in FIG. 1, the threaded pipe 21 of the hose coupling member 2 is first inserted into the fluid hose 3 (such as a soft water pipe), so that the hose coupling member 2 is connected with the fluid hose 3. After that, when it is necessary to seal the hose coupling member 2, the connecting portion 12 of the cover 1 is inserted into the opening of the upper end of the hose coupling member 2, and the annular limit groove 42 is aligned with the opening 43. Afterward, the handle 41 is pulled downward, enabling the limit portion 411 to be engaged into the limit groove 42, and the safety pin 7 is inserted into the pin holes 54 to prevent the handle 41 from turning. The installation of the hose coupling and the fluid hose 3 is completed. During use, the fluid hose 3 can be dragged conveniently by holding the grip portion 13.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A hose coupling, comprising a hose coupling member and a cover, one end of the hose coupling member being disposed for connecting with a distal end of a fluid hose, the cover being inserted into a port of another end of the hose coupling member and configured to seal the hose coupling member, characterized by: the cover comprising a cover face and a connecting portion disposed under the cover face and adapted to connect the hose coupling member, a grip portion being provided on top of the cover face, a space being defined between the grip portion and the cover face of the cover for an operator's hand to pass therethrough;

the cover and the hose coupling member being locked through a locking structure, the locking structure comprising at least two handles, a respective opening for each of the at least two handles, and a limit groove, the limit groove being disposed around a circumferential wall of the connecting portion, each said opening being disposed at a side wall of an upper section of the hose coupling member aligned with the limit groove, the at least two handles being disposed oppositely on the hose coupling member, one end of each handle being a curved limit portion to mate with the limit groove, the curved limit portion penetrating the respective opening to be engaged in the limit groove and being hinged on the hose coupling member through a pivot seat, the pivot seat comprising a first seat and a second seat which are oppositely disposed relative to the respective opening, the curved limit portion being pivotally connected between the first seat and the second seat by a shaft, outer ends of the first seat and the second seat each being formed with a pin hole for a safety pin to be inserted therethrough, enabling the safety pin to lean against the curved limit portion, wherein the connecting portion is integrally formed with the cover face to be one-piece, and the connecting portion is a hollow configuration and provided with reinforcement ribs which are arranged radially and evenly inside the connecting portion.

2. The hose coupling as claimed in claim 1, wherein the cover face has a circular shape with a radius greater than a sectional radius of the hose coupling member.

3. The hose coupling as claimed in claim 2, wherein the grip portion has a length equal to a diameter of the cover face.

4. The hose coupling as claimed in claim 2, wherein the cover face is provided with an annular flange around a circumferential edge thereof.

5. The hose coupling as claimed in claim 1, wherein a bottom surface of the grip portion, facing the cover face, is provided with an anti-skid portion.

6. The hose coupling as claimed in claim 4, wherein the annular flange is a flange wrapped with a rubber layer.

7. The hose coupling as claimed in claim 1, wherein another end of each handle is provided with a circular hook.

8. A hose coupling, comprising a hose coupling member and a cover, one end of the hose coupling member being disposed for connecting with a distal end of a fluid hose, the cover being inserted into a port of another end of the hose coupling member and configured to seal the hose coupling member, characterized by: the cover comprising a cover face and a connecting portion disposed under the cover face and adapted to connect the hose coupling member, a grip portion being provided on top of the cover face, a space being defined between the grip portion and the cover face of the cover for an operator's hand to pass therethrough;

the cover and the hose coupling member being locked through a locking structure, the locking structure comprising at least two handles, a respective opening for each of the at least two handles, and a limit groove, the limit groove being disposed around a circumferential wall of the connecting portion, each said opening being disposed at a side wall of an upper section of the hose coupling member aligned with the limit groove, the at least two handles being disposed oppositely on the hose coupling member, one end of each handle being a curved limit portion to mate with the limit groove, the curved limit portion penetrating the respective opening to be engaged in the limit groove and being hinged on the hose coupling member through a pivot seat, the pivot seat comprising a first seat and a second seat which are oppositely disposed relative to the respective opening, the curved limit portion being pivotally connected between the first seat and the second seat by a shaft, outer ends of the first seat and the second seat each being formed with a pin hole for a safety pin to be inserted therethrough, enabling the safety pin to lean against the curved limit portion, wherein the cover face has a circular shape with a radius greater than a sectional radius of the hose coupling member and is provided with an annular flange around a circumferential edge thereof, and the annular flange is wrapped with a rubber layer.

9. The hose coupling as claimed in claim 8, wherein the grip portion has a length equal to a diameter of the cover face.

10. The hose coupling as claimed in claim 8, wherein a bottom surface of the grip portion, facing the cover face, is provided with an anti-skid portion.

11. The hose coupling as claimed in claim 8, wherein another end of each handle is provided with a circular hook.

* * * * *